3,806,387
SAFETY GLAZINGS AND METHODS OF MAKING THEM
Hans-Dieter Peetz, Aachen, and Heinz Scholl, Duerwiss near Eschweiler, West Germany, assignor to Saint-Gobain Industries, Neuilly-sur-Seine, France
No Drawing. Filed Dec. 9, 1971, Ser. No. 206,525
Claims priority, application France, Dec. 11, 1970, 7044711
Int. Cl. B32b 17/10
U.S. Cl. 156—102                      7 Claims

ABSTRACT OF THE DISCLOSURE

The objects of the invention are accomplished, generally speaking, by a method of making composite glazings of glass and plastic which comprises stacking a sheet of glass, a layer of adhesive, and a layer of thin, transparent plastic sheeting which is not adversely affected by the temperature of unification, constituting elements of the glazing, applying to the plastic sheeting a sheet of glass conforming to the conformation of the said sheet of glass, evacuating and pressing the stack and heating it to the temperature of unification, cooling the stack and removing the conforming layer of glass from the unified glazing.

---

This invention relates to a method of making composite glazings of glass and plastic such as automobile windshields composed of ordinary silicate glass, frequently called silica-soda-lime glass, a layer of themoplastic adhesive, and a thin sheet of transparent plastic, in which the several layers are stacked, the stack is degassed under vacuum, and joined by heat under pressure. There are many variants of that process, that most used at present being composed of two sheets of silicate glass joined by an interlayer of polyvinnyl butyral resin. Such processes are also, in theory, equally applicable to the manufacture of safety windshields in which one of the outer layers is a plastic sheet; such glazings have the advantage that they reduce injuries derived from the shock of a head striking the windshield. According to recent comprehesion of biomechanics, it is when the sheet of plastic is only several tenths of a millimeter thick, and can yield under shock by absorbing a large amount of energy that these windshield types yield the best results. For example very thin sheets of cellulose acetobutyrate or polyamide from 0.1 to 0.4 mm. in thickness have been used.

In the automobile industry the standard for such glazings is high, especially as to optical qualities, and it is very difficult for plastic sheeting to meet the standards, and even when such sheets are free of optical defects before bonding to the glass it is difficult to join them and preserve the optical qualities. These difficulties can be explained in part because the coefficients of expansion of the plastic and the glass differ widely at the temperature at which they are joined, e.g. 130–140° C., a slight warping of the sheet not totally disappearing on cooling the glazing. These phenomena are of the greater importance as the plastic sheets are the thinner.

It is an object of the present invention to make composite glazings of glass and plastic conjoined by an interlayer of adhesive which achieve and retain the optical qualities essential to exacting optical standards.

The objects of the invention are accomplished, generally speaking by a method of making composite glazings of glass and plastic which comprises stacking a first sheet of glass, a layer of adhesive, and a layer of thin, transparent plastic sheeting which is not adversely affected by the temperature of unification, the said first sheet of glass and two layers constituting elements of the glazing, applying to the plastic sheeting a second sheet of glass (hereinafter variously called a conforming, protective, cover, or passing sheet) conforming to the conformation of the said first sheet of glass, pressing and evacuating the stack and heating it to the temperature of unification, cooling the stack and removing the conforming layer of glass from the unified glazing. In the preferred form of the invention the conforming glass applied to the sheet of plastic in the stack is a sheet which has the same three dimensional conformation as the glass sheet of the stack, i.e., as the first sheet of glass above-named. The stack is heated to at least 60 to 70° C., is degassed before pressing begins, then is heated to about 130 to 145° C. under pressure, and the applied glass conforming sheet is removed from the stack after the elements of the stack have been bonded together. This eliminates the apperance of defects of planeity and warping during the treatment by heat under pressure; in particular the internal spaces of the stack are not yet degassed during the first phase of heating, so that the plastic sheet is not yet pressed against the layer of adhesive and against the glass of the stack. It is consequently capable of sliding readily, which restricts the irregularities produced in the second phase of heating, that which follow the degassing, within exceedingly small limits. Finally, contrary to expectation, it has been established that the optical defects preexisting in the plastic material are largely eliminated, so that plastic materials which were previously totally unsatisfactory in these uses are now satisfactory; the optical quality of the conforming sheet of glass appears to be transferred to the sheet of plastic. In fact, while, the outer surface of the plastic sheet engages the conforming glass and acquires its perfection the defects that arise in the layer of adhesive are deprived of importance if the index of refraction of the adhesive is related to that of the sheet of plastic.

The use of protective sheets has been proposed in the manufacture of laminated glass but for use with very thin layers of glass, less than 1.5 mm., to prevent curving of the thin glass layers along the edges, or in using thick polymethacrylate to prevent deterioration of its surface, but it has never been employed to assemble composite sheets of glass and thin plastic to improve the optical qualities of the composite.

In the preferred form the second heating phase, which carries the stack to bonding temperature after degassing, is carried out without intermediate cooling, and a supplementary step yet further improves the result: The outer face of the plastic sheet is coated with a layer capable of being essentially elastically deforming during the treatment of heat and pressure under the protective glass sheet. The outer face of the plastic, thus covered, then conforms perfectly to that of the glass cover without forming optical defects.

The elastic layers that serve this purpose have a low modulus of elasticity at working temperatures, and a plastic deformation less than 2%, and preferably less than 1%, for an elongation of 60 to 70%. They also have scratch resistance. For this purpose aliphatic polyurethanes of slight reticulation are favored.

After heating under pressure the conforming glass sheet is to be kept in place under pressure until the temperature of the composite has dropped to about 50° C.

When making flat sheets any flat cover sheet of glass may be used but in making bent sheets one should use a sheet bent on the same form as that used to bend the glass sheet of the composite, as this produces superior optical qualities. It is advantageous to temper the pressing sheet as it last longer in use, being stronger and less fragile.

To prevent the least adherence between the outer plastic sheet of the stack and the cover glass, a demolding agent can be used.

The following examples illustrate the invention without detraccting from the generality of what is stated elsewhere herein.

A process and apparatus which may be used in practicing the following examples is described in United States patent applications 10,911 and 68,065, the latter now U.S. Pat. No. 3,769,133.

EXAMPLE 1

This example relates to making a safety windshield from a sheet of glass 3 mm. thick, which has been press-bent, a commercial sheet of polyvinyl butyral 0.76 mm. thick, and a sheet of cellulose aceto butyrate 0.35 mm. thick. The sheets of glass and polyvinyl butyral are stacked, the sheet of cellulose aceto butyrate is sprayed on the face thereof which will contact the polyvinyl butyral with an alcoholic solution of tin chloride which favors adherence. Over this stack of three sheets is placed a sheet of conforming glass 3 mm. thick which was bent on the same bending form as the glass of the stack.

Before the application of the conforming glass the face of it which is to engage the stack is covered by powdered magnesium stearate which is to prevent adhesion. The assemblage is then placed in a sealed sack connected to a vacuum pump and placed in an autoclave which can itself be evacuated and placed under pressure independently. As indicated in the above-identified applications the temperature of the autoclave is raised to about 70° C. and both the sack and the autoclave are evacuated. The pressure in the sack is lowered to a few millimeters of Hg and in the autoclave to about 0.3 atmosphere. This treatment withdraws the air from between the different layers of the stack without joining them. The vacuum is maintained for about 15 minutes and the temperature of the autoclave is raised to about 130° C. At the same time the pressure in the autoclave is raised to about 6 atmospheres while the interior of the sack is kept under vacuum. The temperature of 130° C. is maintained for about 45 minutes then it is lowered again while the pressure in the autoclave and the vacuum in the sack are maintained until the temperature of the system is lowered to 50° C. When that temperature is reached the pressure and vacuum are eliminated and the autoclave is opened. The stack is withdrawn from the sack and the cover or conforming glass is removed from it.

EXAMPLE 2

A sheet of cellulose aceto butyrate 0.35 mm. thick is coated on one side with a layer of slightly reticulated aliphatic polyurethane. To achieve this a composition of aliphatic isocyanate and a composition of propylene glycol and ethylene glycol are mixed and deposited on the sheet after homogenization and degassing. It polymerizes on the surface of the sheet, forming a polyurethane. After several hours of polymerization at ordinary temperature the polymerization is completed by a brief thermal treatment at 90° C. The other face of the sheet thus treated is placed on a sheet of polyvinyl butyral 0.76 mm. thick and used to make a composite of Example 1.

The glass cover sheets used in these processes may be used again and again and may themselves be used later as constituent parts of the composite glazings.

The results which this new process achieves are exhibited by the following tests during which flat glazings 500 mm. x 1100 mm. have been made by a conventional process for comparative purposes and, on the other hand, according to the invention, following the two preceding examples, the optical properties of the plastic sheets before their incorporation has been tested and after they have been coated according to Example 2, as well as the optical properties of the final product. The opeical qualities have been determined by the process Zebra described in DIN 52305 called "Optische Prüfung von Sicherheitsglas" by using the process of projection A. To determine the lens effect by process Zebra one uses a ray 12±0.5 mm. wide, alternately black and white which is projected through the glazing. In case of dioptric faults in the glazing the width of the bands will change from place to place. A change in the width of the bands of 1 mm. corresponds, relative to perpendicular luminous rays, to an optical power of 0.01 diopter. For a windshield for example the dioptric defect should not actually exceed 0.06 diopter.

The following table translates the optical defects by the variation in the width of the bands. Column 1 indicates the width B maximum and minimum; column 2 shows the maxima of variation in width corresponding to $\Delta B = |B - 12|$, and column 3 shows by comparison between the preceding divergences the improvement in optical properties obtained by virtue of pressure. The table puts clearly in evidence the improvements in A obtained on the one hand in its simplest form by the process of the invention and on the other hand the improvement obtained when one coats the sheet of plastic with a deformable elastic layer.

TABLE

| | Dioptric defects | | | |
| --- | --- | --- | --- | --- |
| | B, mm. | | B, mm. | A, mm. |
| Test example | Maxi | Mini | | |
| Example 1: | | | | |
| Sheet of plastic | 20 | 3.5 | 8.5 | |
| Conventional procedure | 18 | 5 | 7 | 1.5 |
| Procedure of this invention | 13 | 11 | 1 | 7.5 |
| Example 2: | | | | |
| Coated plastic sheet | 23.5 | 3.2 | 11.5 | |
| Conventional procedure | Not measurable | | | |
| Process of Example 2 | 13.5 | 10.5 | 1.5 | 10 |

As stated above, it is very important that the coating layer consists of a plastic material which has a high elastic deformation power. The aliphatic polyurethanes favorable for this purpose should have the following properties (at room-temperature):

Modulus of elasticity:
    At small deformations _____ kg./cm.$^2$ __ ~1000
    At high deformations _____ kg./cm. ___ ~200
Strain at breaking _____ percent __ 100
Tensile strength _____ kg./cm.$^2$ __ >100
Plastic deformation at straining up to breaking
                                     percent __ <2

The small plastic deformation power must be maintained up to the temperatures of the heating and pressing process, i.e. up to about 140° C. Thus the optical defects due to plastic deformations of the coating layer, that is streaks or cords, are avoided, while the coating is smoothed elastically, and this state in cooling is "frozen in" to a certain extent.

The advantages of the invention are included in a composite glazing having glass and plastic outer layers, the optical properties of which conform to the exacting standards applicable to automobile windshields. Other advantages of the invention reside in the methods of making the windshield from which these optically superior windshields are derived. The windshields themselves have the advantage that they protect the rider against cranial damage should he be thrown against the windshield by sudden stops or collisions while achieving the superior optical qualities which are essential to that use.

As many apparently widely different embodiments of the present invention may be made without departing from the spirit and scope thereof, it is to be understood that the invention is not limited to the specific embodiments.

What is claimed is:

1. A method of making a curved composite glazing including a glass sheet, an adhesive interlayer, and a sheet of transparent plastic material having a thickness of from 0.1 to 0.4 mm., which method comprises bending the glass sheet on a form, assembling the glass sheet, interlayer and plastic sheet into a stack, applying to the plastic sheet in the stack a glass forming sheet bent on the said form, evacuating and pressing and adhesively joining the glass sheet and plastic sheet, and removing the forming sheet from the stack.

2. A method according to claim 1 including the further steps of heating the stack and forming sheet in the course of the pressing step and cooling the stack and forming sheet under pressure before removing the forming sheet.

3. A method according to claim 2 in which the stack and forming sheet are heated to at least 60 to 70° C., are degassed before pressing begins, are heated to about 130 to 145° C. under pressure, and are cooled to about 50° C. before removal of the forming sheet.

4. A method according to claim 3 in which the stack is cooled substantially to room temperature under evacuation and pressure.

5. A method according to claim 1 in which the plastic sheet is composed essentially of a material selected from the group consisting of cellulose acetobutyrate, polyamide, and polymethyl methacrylate.

6. A method according to claim 1 in which prior to assembly of the stack the plastic sheet is coated on one face with a layer elastically deformable by heat and pressure and in which the plastic sheet is assembled to the stack with the last-named layer away from the adhesive layer.

7. A method according to claim 6 in which the deformable layer consists essentially of an aliphatic polyurethane of low reticulation.

References Cited
UNITED STATES PATENTS

| | | | |
|---|---|---|---|
| 3,657,057 | 4/1972 | Shorr et al. | 161—199 |
| 3,027,288 | 3/1962 | Keslar | 156—104 |
| 3,681,167 | 8/1972 | Moore | 156—104 |
| 3,038,825 | 6/1962 | Little | 156—106 |
| 3,673,055 | 6/1972 | Sheld | 161—183 |
| 3,630,812 | 12/1971 | Bruckner | 161—199 |
| 2,258,991 | 10/1941 | McNally | 161—201 |

DANIEL J. FRITSCH, Primary Examiner

U.S. Cl. X.R.

156—104, 106, 212, 214, 278, 286, 311

UNITED STATES PATENT OFFICE
CERTIFICATE OF CORRECTION

Patent No. 3,806,387      Dated April 23, 1974

Inventor(s) Hans Dieter Peetz et al.

It is certified that error appears in the above-identified patent and that said Letters Patent are hereby corrected as shown below:

Column 2, line 3, for "passing" substitute --pressing--.

Signed and sealed this 24th day of September 1974.

(SEAL)
Attest:

McCOY M. GIBSON JR.
Attesting Officer

C. MARSHALL DANN
Commissioner of Patents